Patented June 12, 1951

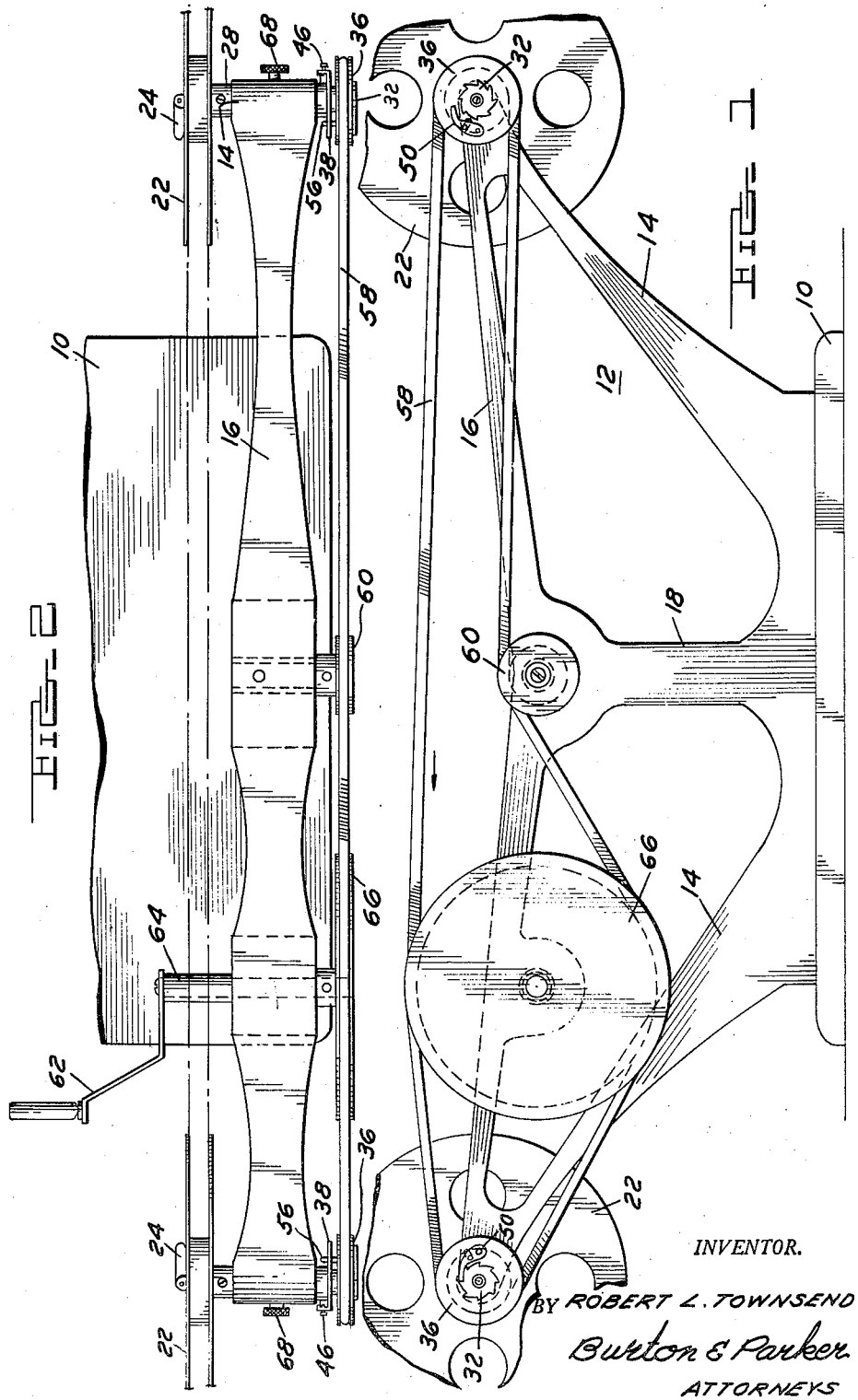

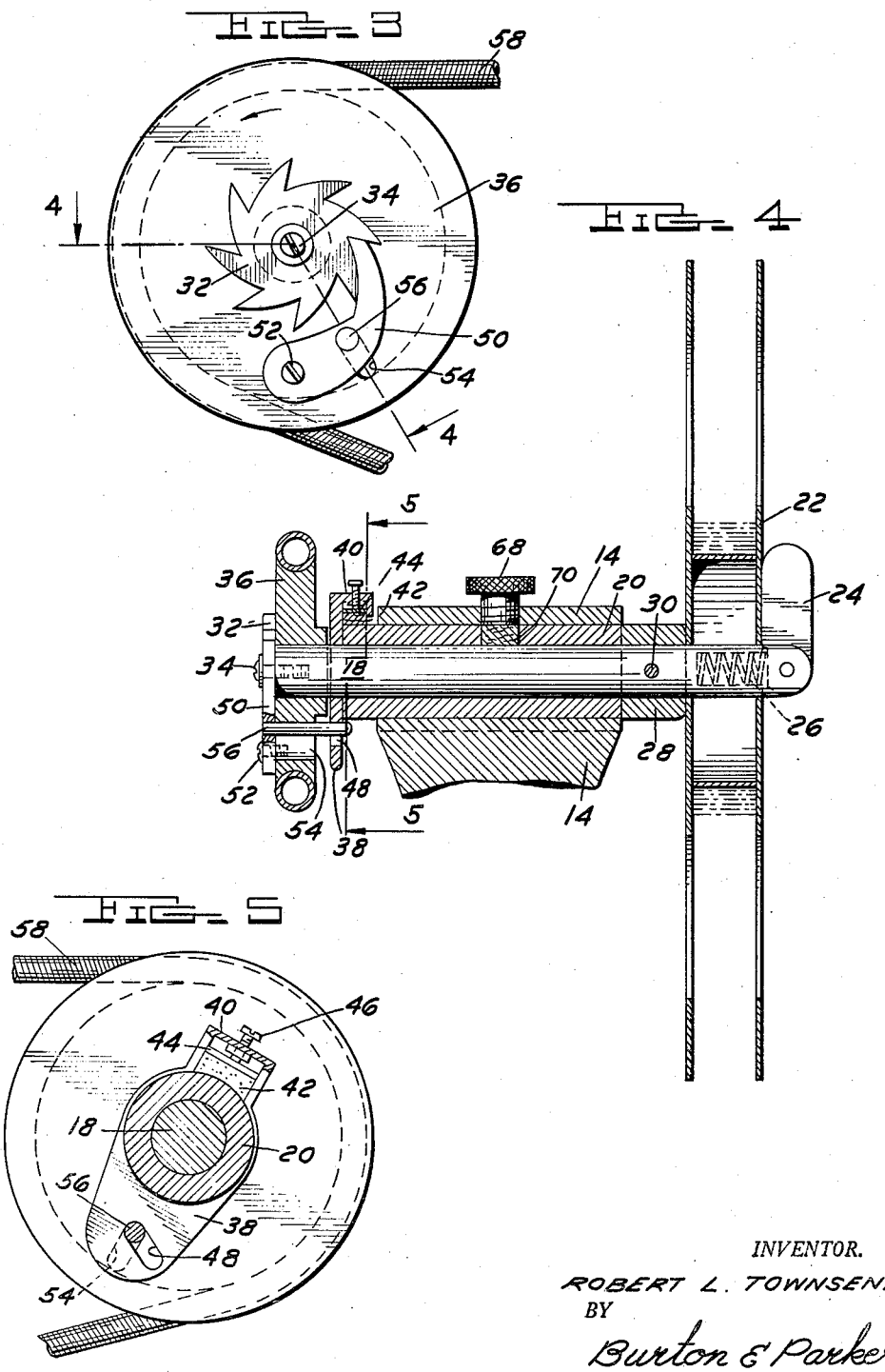

2,556,563

UNITED STATES PATENT OFFICE 2,556,563

REWIND MECHANISM FOR FILM SPOOLS OR REELS

Robert L. Townsend, Detroit, Mich.

Application February 27, 1950, Serial No. 146,577

5 Claims. (Cl. 242—55)

This invention relates to improvements in rewind mechanism for film spools or reels.

An object is to provide rewind mechanism which may be driven from a single crank in either of its two opposite directions merely by reversing the rotation of the crank. The mechanism functions automatically upon reversal of rotation of the crank to wind and unwind the film as desired.

It has heretofore been customary to provide rewind mechanism with a pair of spaced apart rotatably supported spindles each provided with a crank and each adapted to removably support a film spool or reel for rotation therewith to be driven with the spool upon its rotation by its crank. In using this mechanism, it was customary for the operator to use one hand on one crank and the other hand on the other crank so that the film could be selectively driven in either direction depending upon which crank was rotated. This mechanism necessitated the use of both hands by the operator at the task of driving the cranks.

My improved mechanism which employs only one crank leaves one hand of the operator free from this function and is simple and expeditious to use.

The single manually operable crank of my mechanism is so coupled with both reel supporting spindles that either spindle may be selectively driven to rotate a film reel mounted thereon to wind film upon such reel and at the same time withdraw film from the reel mounted on the other spindle. A drag is imposed upon the spindle carrying the unwinding reel so that it will not overrun and the film will be withdrawn evenly and taut.

Each of the two spindles which carries a film supporting reel is provided with a pulley wheel mounted thereon and adapted to be operatively coupled thereto to drive the spindle with the pulley or to release the spindle from the pulley so that the pulley may be rotated at a rate different from that of the spindle. This clutch mechanism functions automatically depending upon the direction of rotation imparted to the pulley. The two pulleys which are mounted on the two spindles are coupled together by a driving belt or the like. A manually driven pulley engages this belt to drive it in either of two opposite directions.

In one direction of rotation of the belt one pulley and its spindle is driven to wind film upon the reel mounted on such spindle. In the opposite direction of rotation of the belt the other pulley and its spindle is driven to wind film upon the reel upon such spindle. As film is being constantly wound upon one reel and unwound from the other, the rate of rotation of the two wheels is of necessity different. It is desirable that the film at all times be held taut between the reels. The construction is such that the unwinding reel may have a rate of rotation different from that of the driven pulley mounted on the reel.

Other objects, advantages and meritorious features of the invention will more fully appear from the following description, claims and accompanying drawings, wherein:

Fig. 1 is a side elevation partly broken away of my film rewind mechanism;

Fig. 2 is a top plan view of the structure shown in Fig. 1;

Fig. 3 is an enlarged side elevation of one end of the construction shown in Fig. 1 and particularly the driving pulley mounted on the reel carrying spindle and the clutch mechanism which is provided to couple the pulley with the spindle or release the same therefrom;

Fig. 4 is a sectional view taken on the line 4—4 of Fig. 3; and

Fig. 5 is a sectional view taken on the line 5—5 of Fig. 4.

The mechanism comprises a bed plate 10 which carries an upright frame structure indicated generally as 12 and consisting of a pair of end members 14 which extend upwardly and outwardly from the bed plate, as shown, and which are complementary to each other. A bridge portion 16 extends between the upper ends of these end members. This bridge portion is supported from the base by a standard 18, as shown in Fig. 1. At the outer end of each end member 14 there is journalled a spindle 18. This spindle is journalled within a bushing 20 which is itself mounted within the outer end of the end member as shown in Fig. 4. One end of this spindle is adapted to removably receive a frame carrying reel 22 which is detachably held thereon by a clamping lever 24 acted upon by a spring 26 in a conventional manner to clamp the reel between the clamping lever 24 and a stop portion 28 secured to the spindle by a set screw 30, as shown in Fig. 4.

The opposite end of the spindle has a ratchet or sprocket wheel 32 fixed thereto by a screw 34 to revolve therewith. Upon this opposite end of the spindle there is freely journalled a pulley wheel 36. This pulley wheel is supported as shown in Fig. 4 between the ratchet 32 and a plate 38 mounted on the spindle between the pulley and the end of the bushing 20 as shown particularly in Figs. 4 and 5. The plate 38 is mounted freely on the spindle 18. Such plate is provided with overhanging portion 40 within which is mounted a friction shoe 42. This shoe has a metal backing 44. An adjustment screw 46 extends through the part 40 of the plate to adjust the screw with respect to the bushing 20 against which the shoe is adapted to bear. The bushing 20 is stationary. The plate 40 is provided with a slot 48.

A dog 50 is pivoted to each pulley wheel 36 upon a pivot 52. This dog is adapted as shown in Figs. 1 and 3 to engage the ratchet wheel 32 or to be moved out of engagement therewith as shown at the top of the sheet on Fig. 1. The pulley wheel 36 has a slot 54 therethrough and the dog carries a pin 56 which extends through the slot 54 in the pulley and into the slot 48 in the plate 38, as shown in Figs. 4 and 5.

The two pulley wheels 36 are coupled together by a belt 58. This belt is here shown as a spring tension belt. It extends over an idler pulley 60 mounted on the frame. The belt 58 is driven from manually operable crank mechanism which includes a crank handle 62 mounted on a spindle 64 which spindle is journalled in the frame as shown in Figs. 1 and 2. The spindle carries a drive pulley 66 which engages and drives the belt. It is adapted to drive the belt in either of two opposite directions.

Simple brake mechanism to retard the rotation of each spindle is provided. This is shown in the form of an adjustable screw 68 threaded through the end 14 of the frame, as shown particularly in Fig. 4. A friction shoe 70 is mounted within a cutout portion in the bushing 20. The screw 68 bears against the friction shoe to urge it against the shaft 18 to resist the rotation of the shaft.

In the operation of the rewind mechanism when the belt is driven in the direction of the arrow shown in Fig. 1, the dog 50 shown at the bottom of the sheet engages the ratchet wheel 32 and the spindle to which this ratchet wheel is fixed is driven to wind film upon the reel 22 mounted on such spindle and such film is naturally unwound from the reel 22 mounted on the spindle at the opposite end of the frame. When the drive pulley is manually rotated so as to rotate the pulley 36 at the bottom of the sheet in Fig. 1 in a counter-clockwise direction or the pulley 36 shown in Fig. 3 in a counter-clockwise direction and in the direction of the arrow, the dog 50 picks up the ratchet to rotate the ratchet with the pulley and also to rotate the shaft 18 with the ratchet. This is due to the fact that each pulley wheel 36 is freely rotatable upon the shaft 18 except as held thereto by the dog and ratchet mechanism. The plate 38 while freely rotatable upon the shaft 18 carries the brake shoe 42 which engages the bushing 20 and, therefore, this rotation of the plate 38 is resisted. When the mechanism is operated to drive the pulley 36 shown in Fig. 3 in the direction of the arrow, this pulley initially overruns the plate 38 and the pin 56 which extends through the slot 48 in the plate 38 is moved toward the shaft so that the dog 50 is moved in to pick up the ratchet wheel 32.

The exact opposite happens in connection with the pulley and clutch mechanism at the opposite end of the frame. This will be seen from considering the views in Figs. 3 and 4. If the pulley wheel 36 in Fig. 3 were rotated in a clockwise direction, the dog would be moved out of engagement with the ratchet wheel 32 because the pin 56 carried by the dog would travel outwardly radially through the slot 54 in the pulley wheel as it rode outwardly through the slot 48 and the plate 38, such plate being initially held stationary while permitting the pulley wheel to overrun it for a limited distance.

It will be seen, therefore, that in one direction of rotation the pulley wheel at one end of the frame is driven and film is wound upon the reel on the spindle on which such pulley is mounted. The pulley at the opposite end of the frame is declutched from its spindle so that it can rotate with its companion pulley as driven by the belt while the spindle and film reel mounted on the declutched shaft can rotate at whatever rate is necessary to unwind film from the reel.

What I claim is:

1. Film reel rewind mechanism comprising, in combination, a pair of rotatably journalled spindles, each spindle adapted to support a film reel to rotate therewith, a pulley mounted on each spindle to rotate therewith or to rotate independently thereof, clutch mechanism associated with each pulley operable in one direction of rotation of the pulley to couple the pulley to its spindle to rotate the spindle and in the opposite direction of rotation of the pulley to release the pulley from the spindle for rotation independently of the spindle, said clutch mechanism including a part journalled upon the spindle and normally rotatable with the pulley having means resisting its rotation whereby the pulley may initially overrun the part to release the pulley from driving connection with the spindle, and manually operable means coupled with the pulley to drive them in either of two opposite directions.

2. Film reel rewind mechanism comprising, in combination, a pair of rotatably journalled spindles, each spindle adapted to support a film reel to rotate therewith, a pulley mounted on each spindle to rotate therewith or to rotate independently thereof, a ratchet wheel mounted on the spindle alongside the pulley, a dog pivoted to the pulley to be moved into and out of driving engagement with the ratchet wheel, a part journalled upon the spindle and coupled with the pulley to rotate normally therewith adapted to permit rotation of the pulley relative to said part for a limited distance, means resisting the rotation of said part, a connection between the part and the dog operable upon rotation of the pulley in a given direction relative to the part to move the dog out of driving engagement with the ratchet wheel, and manually operable means coupled with the pulleys to drive them in opposite directions.

3. Film reel rewind mechanism comprising, in combination, a pair of rotatably journalled spindles, each spindle adapted to support a film reel to rotate therewith, a pulley mounted on each spindle to rotate therewith or to rotate independently thereof, a ratchet wheel mounted on the spindle alongside the pulley, a dog pivoted to the pulley to be moved into and out of driving engagement with the ratchet wheel, a part journalled upon the spindle and coupled with the pulley to rotate normally therewith adapted to permit rotation of the pulley relative to said part for a limited distance, means resisting the rotation of said part, a connection between the part and the dog operable upon rotation of the pulley in one direction relative to the part to move the dog out of driving engagement with the ratchet wheel to release the pulley from the shaft for driving and operable upon rotation of the pulley in the opposite direction relative to the part to move the dog into engagement with the ratchet wheel to couple the pulley to the shaft to drive the shaft, and manually operable means coupled with the pulleys to drive them in either of two opposite directions.

4. Film reel rewind mechanism comprising, in combination, a pair of rotatably journalled spindles, each spindle adapted to support a film reel to rotate therewith, a pulley mounted on each spindle to rotate therewith or to rotate independently thereof, a ratchet wheel mounted on the spindle alongside of the pulley, a dog pivoted to the pulley to be moved into or out of driving engagement with the ratchet wheel, a plate journalled upon the spindle alongside the pulley upon the side opposite to the ratchet wheel, means extending through the pulley coupling the dog with the plate and coupling the plate with the pulley to rotate therewith permitting rotation for a limited distance of the pulley with respect to the plate, means resisting rotation of the plate whereby the pulley may overrun the plate for a limited distance, a connection extending between the plate and the dog operable to move the dog into or out of engagement with the ratchet wheel upon limited rotation of the pulley relative to the plate, and manually operable means coupled with the pulleys to rotate them in either of two opposite directions.

5. Film reel rewind mechanism comprising, in combination, a pair of rotatably journalled spindles, each spindle adapted to support a film reel to rotate therewith, a pulley mounted on each spindle to rotate therewith or to rotate independently thereof, a ratchet wheel fixed to each spindle to rotate therewith and disposed alongside of the pulley mounted on the spindle, a dog pivoted to the pulley to be moved into and out of driving engagement with the ratchet wheel, a plate journalled upon the spindle alongside the pulley upon the side opposite the ratchet wheel, said pulley provided with a slot therethrough, said plate provided with a slot therethrough, a pin carried by the dog extending through the slot in the pulley and into the slot in the plate coupling the plate with the pulley to rotate therewith permitting rotation of the pulley for a limited distance relative to the plate, means resisting rotation of the plate whereby the pulley may overrun the plate for a limited arc of rotation, said pin coupling the plate with the dog whereby the dog is moved into or out of engagement with the ratchet wheel upon rotation of the pulley for a limited distance relative to the plate, a belt extending between said pulleys, a manually rotatable driving pulley engaging said belt to drive the belt in either of two opposite directions.

ROBERT L. TOWNSEND.

REFERENCES CITED

The following references are of record in the file of this patent:

UNITED STATES PATENTS

| Number | Name | Date |
|---|---|---|
| 1,248,017 | Sande | Nov. 27, 1917 |

FOREIGN PATENTS

| Number | Country | Date |
|---|---|---|
| 836,801 | France | Oct. 25, 1938 |